United States Patent
Wu

(10) Patent No.: US 11,991,756 B2
(45) Date of Patent: May 21, 2024

(54) RANDOM ACCESS TRANSMISSION METHOD AND TERMINAL

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 399 days.

(21) Appl. No.: 17/383,685

(22) Filed: Jul. 23, 2021

(65) Prior Publication Data

US 2021/0352742 A1 Nov. 11, 2021

Related U.S. Application Data

(63) Continuation of application No. PCT/CN2020/073524, filed on Jan. 21, 2020.

(30) Foreign Application Priority Data

Jan. 25, 2019 (CN) .......................... 201910075313.6

(51) Int. Cl.
*H04W 74/0833* (2024.01)
*H04W 72/02* (2009.01)
(Continued)

(52) U.S. Cl.
CPC ....... *H04W 74/0841* (2013.01); *H04W 72/02* (2013.01); *H04W 72/0446* (2013.01); *H04W 72/0453* (2013.01); *H04W 74/004* (2013.01)

(58) Field of Classification Search
CPC ............. H04W 74/0841; H04W 72/02; H04W 72/0446; H04W 72/0453; H04W 74/004;
(Continued)

(56) References Cited

U.S. PATENT DOCUMENTS

| 2009/0186613 A1 | 7/2009 | Ahn et al. |
| 2011/0013542 A1 | 1/2011 | Yu et al. |

(Continued)

FOREIGN PATENT DOCUMENTS

| CN | 101686544 A | 3/2010 |
| CN | 103987126 A | 8/2014 |

(Continued)

OTHER PUBLICATIONS

PCT International Search Report and Written Opinion for PCT/CN2020/073524; dated Apr. 22, 2020.

(Continued)

*Primary Examiner* — Afshawn M Towfighi
(74) *Attorney, Agent, or Firm* — von Briesen & Roper, s.c.

(57) ABSTRACT

A random access transmission method and a terminal are provided. The method includes: obtaining resource allocation information for random access, where the resource allocation information indicates at least two candidate random access resources, and the candidate random access resources include candidate resources for sending data; selecting a target random access resource from the at least two candidate random access resources according to a preset selection rule; and sending a random access request message over the target random access resource.

20 Claims, 6 Drawing Sheets

(51) Int. Cl.
*H04W 72/0446* (2023.01)
*H04W 72/0453* (2023.01)
*H04W 74/00* (2009.01)

(58) Field of Classification Search
CPC ........... H04W 74/006; H04W 74/0833; H04W 74/002; Y02D 30/70
See application file for complete search history.

(56) References Cited

U.S. PATENT DOCUMENTS

| | | | |
|---|---|---|---|
| 2017/0325267 A1 | 11/2017 | Zhu et al. | |
| 2018/0176947 A1 | 6/2018 | Yu et al. | |
| 2019/0335511 A1* | 10/2019 | Liu | H04W 76/11 |
| 2019/0350006 A1 | 11/2019 | Qian et al. | |
| 2020/0029369 A1 | 1/2020 | Huang et al. | |
| 2020/0252969 A1* | 8/2020 | Chen | H04W 56/001 |
| 2020/0344621 A1* | 10/2020 | Xu | H04W 72/21 |
| 2021/0168819 A1* | 6/2021 | Lou | H04L 5/0055 |
| 2021/0176781 A1* | 6/2021 | Wang | H04W 74/006 |

FOREIGN PATENT DOCUMENTS

| | | | |
|---|---|---|---|
| CN | 108289338 A | 7/2016 | |
| CN | 107820728 A | 3/2018 | |
| CN | 108633050 A | 10/2018 | |
| WO | 2016119111 A1 | 8/2016 | |
| WO | 2017028051 A1 | 2/2017 | |
| WO | 2018129334 A1 | 7/2018 | |

OTHER PUBLICATIONS

First Chinese Office Action for related to application No. 201910075313.6; dated Jun. 29, 2021,.
CATT; "Further details on NR 4-step RA Procedure", 3GPP TSG RAN WG1 Meeting #88, Athens, Greece, Feb. 13-17, 2017, R1-1702066.
Japanese Notice of Reasons for Refusal for related Application No. 2021-543216; dated Aug. 4, 2022.
Ericsson, "NR two-step random access procedure", Jan. 16-20, 2017, 3GPP TSG-RAN WG1 NR adhoc, Spokane, USA, R1-1700300.
Extended European Search Report for related Application No. 20745595.7; dated Feb. 22, 2022.
Samsung, "Discussion on simplified on RACH procedure", Nov. 14-18, 2018, 3GPP TSG RAN WG1 Meeting #87, Reno, Nevada, USA, R1-1612468.
Japanese Decision of Refusal for related Application No. 2021-543216; dated Mar. 7, 2023.
Vivo, "Clarification on the PRACH resource selection of multiple beams", Oct. 9-13, 2017, 3GPP TSG-RAN WG2 Meeting #99bis, Prague, Czech Republic, R2-1710938.
Intel Corporation R2, "Correction to RO selection procedure", Jul. 2-6, 2018, 3GPP TSG-RAN WG2 NR AdHoc #1807, Montreal, Canada, R2-1809804.

* cited by examiner

RANDOM ACCESS TRANSMISSION METHOD AND TERMINAL

CROSS-REFERENCE TO RELATED APPLICATIONS

This application is continuation application of PCT International Application No. PCT/CN2020/073524 filed on Jan. 21, 2020, which claims priority to Chinese Patent Application No. 201910075313.6, filed in China on Jan. 25, 2019, the disclosures of which are incorporated herein by reference in their entireties.

TECHNICAL FIELD

This disclosure relates to the field of communications technologies, and in particular, to a random access transmission method and a terminal.

BACKGROUND

The 5th generation (5G) mobile communications systems, or new radio (NR) systems, need to adapt to diverse scenarios and service requirements. In an uplink transmission mode, if a terminal needs to send uplink data, uplink timing synchronization has to be obtained through a random access procedure, that is, the terminal obtains uplink timing advance (TA) information from a network device, before the terminal can send uplink data through dynamic scheduling or semi-persistent scheduling. When an uplink data packet is small, the terminal can send uplink data in an unsynchronized state in order to reduce resource and power consumption. Sending uplink data by the terminal in the unsynchronized state, for example, sending a physical uplink shared channel (PUSCH) by the terminal in the unsynchronized state, can be implemented through a random access procedure.

The random access procedure may be implemented as a 4-step or 2-step random access procedure. For the 2-step random access, as shown in FIG. 1, the network device configures configuration information of a 2-step random access channel (2-step RACH) for the terminal. When triggering the 2-step RACH procedure, the terminal sends a random access request message (MsgA) to the network device, where MsgA can be sent through a PUSCH or a physical random access channel (PRACH). After receiving the MsgA, the network device sends a random access acknowledgment message (Massage B, MsgB) to the terminal. If the terminal fails to receive the MsgB, the terminal sends another MsgA. The network device can configure a plurality of resources for the random access procedure for the terminal. When triggering the 2-step RACH procedure, the terminal is unable to determine which resources are to be used for transmitting the random access request message.

SUMMARY

Embodiments of this disclosure provide a random access transmission method and a terminal.

According to a first aspect, an embodiment of this disclosure provides a random access transmission method, applied to a terminal side and including:

obtaining resource allocation information for random access, where the resource allocation information indicates at least two candidate random access resources, and the candidate random access resources include candidate resources for sending data;

selecting a target random access resource from the at least two candidate random access resources according to a preset selection rule; and sending a random access request message over the target random access resource.

According to a second aspect, an embodiment of this disclosure further provides a terminal, including:

an obtaining module, configured to obtain resource allocation information for random access, where the resource allocation information indicates at least two candidate random access resources, and the candidate random access resources include candidate resources for sending data;

a selecting module, configured to select a target random access resource from the at least two candidate random access resources according to a preset selection rule; and a sending module, configured to send a random access request message over the target random access resource.

According to a third aspect, an embodiment of this disclosure provides a terminal. The terminal includes a processor, a memory, and a computer program stored in the memory and running on the processor. When the computer program is executed by the processor, the steps of the foregoing random access transmission method are implemented.

According to a fourth aspect, an embodiment of this disclosure provides a computer-readable storage medium, where the computer-readable storage medium stores a computer program. When the computer program is executed by a processor, the steps of the foregoing random access transmission method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

Figure 1:
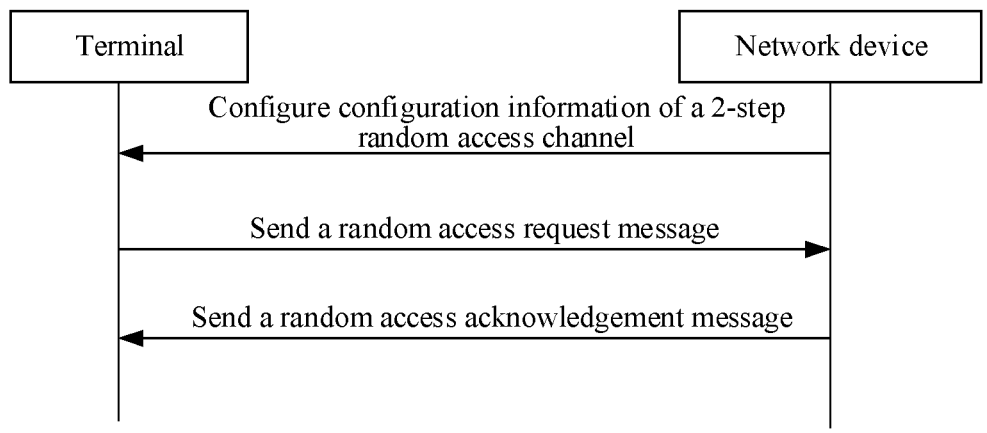
FIG. 1 is a schematic flowchart of a 2-step random access procedure.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided for a more thorough understanding of this disclosure and can convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies. However, in the following descriptions, an NR system is described for an illustration purpose, and NR terms are used in most of the following descriptions, but these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 2:
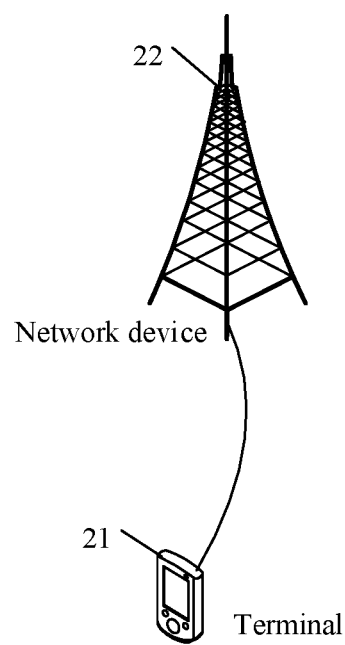
FIG. 2 is a block diagram of a mobile communications system to which an embodiment of this disclosure may be applied.

FIG. 2 is a block diagram of a wireless communications system to which an embodiment of this disclosure may be applied. The wireless communications system includes a terminal 21 and a network device 22. The terminal 21 may also be referred to as a terminal device or user equipment (UE). The terminal 21 may be a terminal side device such as a mobile phone, a tablet computer, a laptop computer, a personal digital assistant (PDA), a mobile internet device (MID), a wearable device, or an in-vehicle device. It should be noted that the specific type of the terminal 21 is not limited in the embodiments of this disclosure. The network device 22 may be a base station or a core network, where the base station may be a base station of 5G or a later version (for example, a gNB or a 5G NR NB), or a base station in other communications systems (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate term in the art. As long as the same technical effect is achieved, the base station is not limited to a specific technical term. It should be noted that the base station in the NR system is taken only as an example in the embodiments of this disclosure, but a specific type of the base station is not limited.

The base station may communicate with the terminal 21 under the control of a base station controller. In various examples, the base station controller may be a part of the core network or some base stations. Some base stations may exchange control information or user data with the core network by using backhauls. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may communicate wirelessly with the terminal 21 through one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, and a picocell base station). The base station may also use different radio technologies, such as cellular and WLAN radio access technologies. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL)

transmission (for example, from the terminal 21 to the network device 22), or a downlink for carrying a downlink (DL) transmission (for example, from the network device 22 to the terminal 21). The UL transmission may also be referred to as reverse link transmission, while the DL transmission may also be referred to as forward link transmission. A licensed band, an unlicensed band, or both may be used for downlink transmission. Similarly, a licensed band, an unlicensed band, or both may be used for uplink transmission.

Figure 3:
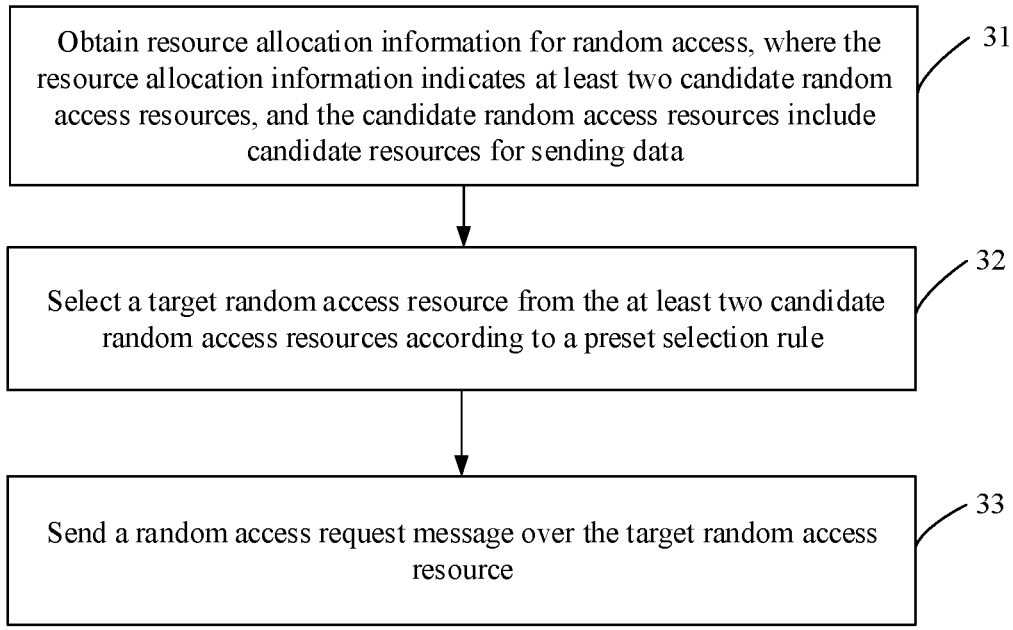
FIG. 3 is a schematic flowchart of a random access transmission method according to an embodiment of this disclosure.

An embodiment of this disclosure provides a random access transmission method, applied to a terminal side. As shown in FIG. 3, the method includes the following steps.

Step 31. Obtain resource allocation information for random access, where the resource allocation information indicates at least two candidate random access resources, and the candidate random access resources include candidate resources for sending data.

The resource allocation information in this embodiment of this disclosure may be predefined, for example, being prescribed by a protocol; or may be received by a terminal from a network device side, which means that the network device configures a resource for random access for the terminal. The candidate random access resources herein refer to resources available for use in a random access procedure. Further, the candidate random access resources may include only candidate resources for sending data, for example, candidate resources for PUSCH for sending data. In addition, the candidate random access resources may further include candidate resources for sending control information, for example, candidate resources for PRACH. The candidate resources for sending control information may include, but are not limited to: a candidate time-frequency resource position of a random access channel and/or a preamble (PRACH preamble) of the random access channel. The candidate time-frequency resource position of a random access channel includes a random access channel occasion (PRACH Occasion, PRO), where candidate resources for PUSCH are in one-to-one correspondence to candidate resources for PRACH, or a plurality of candidate resources for PUSCH correspond to a same candidate resource for PRACH, or a plurality of candidate resources for PRACH correspond to a same candidate resource for PRACH.

Step 32. Select a target random access resource from the at least two candidate random access resources according to a preset selection rule.

The preset selection rule is related to positions of the at least two candidate random access resources. To be specific, the terminal can select the target random access resource from the at least two candidate random access resources based on position information of the at least two candidate random access resources. It should be noted that in a case that the candidate random access resources include only the candidate resources for sending data, the terminal selects the target random access resource based on position information of at least two candidate resources for sending data. In a case that the candidate random access resources include both the candidate resources for sending data and the candidate resources for sending control information, the terminal selects the target random access resource based on the position information of the candidate resources for sending data and position information of the candidate resources for sending control information. Alternatively, the terminal considers the candidate resources for sending data and the candidate resources for sending control information that have an association relationship as a whole, and selects the target random access resource based on overall position information. It should be noted that in a case that the candidate random access resources include both the candidate resources for sending data and the candidate resources for sending control information, the candidate resource for sending data and the candidate resource for sending control information that are included in the target random access resource selected by the terminal have an association relationship.

Step 33. Send a random access request message over the target random access resource.

The terminal sends the random access request message (MsgA) over the selected target random access resource. Correspondingly, the network device feeds back a random access acknowledgment message (MsgB) to the terminal based on the received MsgA. The candidate random access resources may also be referred to as transmission resources for MsgA.

In this embodiment of this disclosure, resource allocation information indicates at least two candidate random access resources. The candidate random access resources may include only candidate resources for sending data; or the candidate random access resources may include both the candidate resources for sending data and the candidate resources for sending control information that have an association relationship. Specifically, the resource allocation information includes at least one of the following information:

first resource allocation information of the candidate resources for sending data, where the first resource allocation information may also be referred to as resource allocation information for sending data, and indicate candidate resources for PUSCH for sending data;

second resource allocation information of the candidate resources for sending control information that are corresponding to the candidate resources for sending data, where the second resource allocation information may also be referred to as allocation information of resources for sending control information, and indicate the resources for sending control information corresponding to the candidate resources for sending data, for example, candidate resources for PRACH;

first indication information for indicating an association relationship between the candidate resources for sending data and the candidate resources for sending control information, where the first indication information is used to indicate the association relationship between the candidate resources for sending control information and the candidate resources for sending data, and the association relationship may be that: one or more candidate resources for sending control information correspond to one candidate resource for sending data; or one or more candidate resources for sending data correspond to one candidate resource for sending control information;

second indication information for indicating an association relationship between the candidate random access resources and carriers, where the association relationship between the candidate random access resources and the carriers may be: one or more candidate random access resources correspond to one uplink carrier, or one candidate random access resource corresponds to two or more uplink carriers; or third indication information for indicating an association relationship between the candidate random access resources and signals, where the association relationship between the candidate random access resources and the signals may be: one or more candidate random access resources correspond to one signal, or one candidate random access resource corresponds to two or more signals. The signals described herein may include, but are not limited to: synchronous signal blocks (SSB) and/or channel state information reference signals (CSI-RS).

Specifically, candidate resources for PRACH in the candidate random access resources are associated with particular carriers and/or particular signals. Alternatively, candidate resources for PUSCH in the candidate random access resources are associated with particular carriers and/or particular signals. Alternatively, candidate resources for PRACH and candidate resources for PUSCH in the candidate random access resources are both associated with particular carriers and/or particular signals. For example, candidate random access resource 1 corresponds to uplink carrier 1 and SSB1. It should be noted that when M candidate random access resources are associated with particular carriers and/or particular signals, during selection of the target random access resource, the particular carriers and/or the particular signals are selected first, and then the candidate random access resources associated with the particular carriers and/or the particular signals are selected.

In the following embodiments of this disclosure, further description is made with respect to scenarios where the candidate random access resources may include only the candidate resources for sending data, and where the candidate random access resources include both the candidate resources for sending data and the candidate resources for sending control information that have an association relationship.

Scenario 1. The candidate random access resources may include only the candidate resources for sending data.

In this scenario, the preset selection rule includes: in a case of contiguous resources, randomly selecting one of the contiguous resources. Correspondingly, step 32 includes: selecting a target data transmission resource from the candidate resources for sending data in the at least two candidate random access resources according to the preset selection rule; and determining the target data transmission resource as the target random access resource. Specifically, the step of selecting a target data transmission resource from the candidate resources for sending data in the at least two candidate random access resources according to the preset selection rule includes: in a case that the at least two candidate resources for sending data are contiguous, the terminal selects one of the contiguous candidate resources for sending data as the target data transmission resource, so that the configured candidate random access resources have an opportunity to be selected, improving a random access success rate and resource utilization.

Alternatively, the preset selection rule may further include: in a case of noncontiguous resources, selecting the latest available one from the noncontiguous resources. The case of noncontiguous resources described herein may include all cases except the case of contiguous resources, or a case that a resource position meets a specified condition. Correspondingly, the step of selecting a target data transmission resource from the candidate resources for sending data in the at least two candidate random access resources according to the preset selection rule includes: in a case that the at least two candidate resources for sending data are noncontiguous, the terminal selects the latest available one from the at least two candidate resources for sending data as the target data transmission resource. This can ensure that the terminal completes sending MsgA as soon as possible.

Scenario 2. The candidate random access resources include both the candidate resources for sending data and the candidate resources for sending control information that have an association relationship.

In this scenario, the terminal can select, according to the preset selection rule, the candidate resources for sending data and then the candidate resources for sending control information, or select the associated candidate resources for sending data and candidate resources for sending control information as a whole according to the preset selection rule.

Manner 1. The terminal performs selection first from the candidate resources for sending data, and then from the candidate resources for sending control information.

In this manner, step 32 includes: selecting a target data transmission resource from the candidate resources for sending data in the at least two candidate random access resources according to the preset selection rule; selecting, according to the preset selection rule, the target control information transmission resource from the candidate resources for sending control information that are corresponding to the target data transmission resource; and determining the target data transmission resource and the target control information transmission resource as the target random access resource.

It should be noted that the preset selection rule described herein includes: in the case of contiguous resources, randomly selecting one of the contiguous resources, or in the case of noncontiguous resources, selecting the latest available one of the noncontiguous resources. In this manner, for contiguous candidate resources for sending data, the terminal randomly selects one of the contiguous candidate resources for sending data as the target data transmission resource. For candidate resources for sending data in other cases (namely, noncontiguous candidate resources for sending data), the terminal selects the latest available candidate resource for sending data (for example, a next available candidate resource for sending data immediately following a moment of triggering random access resource selection) as the target data transmission resource. After the terminal selects the target data transmission resource, if the target data transmission resource corresponds to a plurality of candidate resources for sending control information, the terminal randomly selects one of the contiguous candidate resources for sending control information as the target control information transmission resource. For the candidate resources for sending control information in other cases (namely, noncontiguous candidate resources for sending control information), the terminal selects the latest available candidate resource for sending control information (for example, a next available candidate resource for sending control information immediately following a moment of triggering random access resource selection) as the target control information transmission resource. The terminal determines the selected target data transmission resource and target control information transmission resource as the target random access resource.

Manner 2. The terminal performs selection first from the candidate resources for sending control information, and then from the candidate resources for sending data.

In this manner, step 32 includes: selecting a target control information transmission resource from the candidate resources for sending control information in the at least two candidate random access resources according to the preset selection rule; selecting, according to the preset selection rule, a target data transmission resource from the candidate resources for sending data that are corresponding to the target control information transmission resource; and determining the target control information transmission resource and the target data transmission resource as the target random access resource.

It should be noted that the preset selection rule described herein includes: in the case of contiguous resources, randomly selecting one of the contiguous resources, or in the case of noncontiguous resources, selecting the latest available one of the noncontiguous resources. In this manner, for contiguous candidate resources for sending control information, the terminal randomly selects one of the contiguous candidate resources for sending control information as the target control information transmission resource. For the candidate resources for sending control information in other cases (namely, noncontiguous candidate resources for sending control information), the terminal selects the latest available candidate resource for sending control information (for example, a next available candidate resource for sending control information immediately following a moment of triggering random access resource selection) as the target control information transmission resource. After the terminal selects the target control information transmission resource, if the target control information transmission resource corresponds to a plurality of available candidate resources for sending data, for contiguous candidate resources for sending data, the terminal randomly selects one of the contiguous candidate resources for sending data as the target data transmission resource. For candidate resources for sending data in other cases (namely, noncontiguous candidate resources for sending data), the terminal selects the latest available candidate resource for sending data (for example, a next available candidate resource for sending data immediately following a moment of triggering random access resource selection) as the target data transmission resource. The terminal determines the selected target data transmission resource and target control information transmission resource as the target random access resource.

Manner 3. The terminal selects both the target control information transmission resource and the target data transmission resource.

In this manner, step 32 includes: selecting a target control information transmission resource and a target data transmission resource from the at least two candidate random access resources according to the preset selection rule; and determining the target control information transmission resource and the target data transmission resource as the target random access resource.

It should be noted that the preset selection rule described herein includes: in the case of contiguous resources, randomly selecting one of the contiguous resources, or in the case of noncontiguous resources, selecting the latest available one of the noncontiguous resources. In this manner, for contiguous candidate random access resources, the terminal selects a pair of a target data transmission resource and a target control information transmission resource that are associated from the contiguous candidate random access resources as the target random access resource. For candidate random access resources in other cases (namely, noncontiguous candidate random access resources), the terminal selects a pair of a target data transmission resource and a target control information transmission resource with an earliest sending end location from the noncontiguous candidate random access resources as the target random access resource.

The above introduces different methods for selecting the target random access resource in different scenarios. The preset selection rules related to resource positions are mentioned in the foregoing selecting methods. The following will further describe the contiguous resources and the noncontiguous resources involved in the preset selection rule with reference to the accompany drawings in this embodiment.

The case of contiguous resources mentioned in the preset selection rule includes at least one of the following:

at least two candidate resources for sending data in the candidate random access resources are contiguous; where if the candidate random access resources include only candidate resources for sending data, the candidate random access resources are considered to be contiguous when at least two candidate resources for sending data are contiguous; alternatively, if the candidate random access resources include both the candidate resources for sending data and the candidate resources for sending control information, the candidate random access resources may be considered to be contiguous as long as at least two candidate resources for sending data are contiguous;

at least two candidate resources for sending control information in the candidate random access resources are contiguous, where if the candidate random access resources include both the candidate resources for sending data and the candidate resources for sending control information, the candidate random access resources may be considered to be contiguous as long as at least two candidate resources for sending control information are contiguous; or at least two candidate resources for sending data in the candidate random access resources are contiguous and at least two candidate resources for sending control information in the candidate random access resources are contiguous, where if the candidate random access resources include both candidate resources for sending data and candidate resources for sending control information, the candidate random access resources can be considered to be contiguous only if at least two candidate resources for sending control information are contiguous and candidate resources for sending data corresponding to the contiguous candidate resources for sending control information are also contiguous; alternatively, the candidate random access resources can be considered to be contiguous only if at least two candidate resources for sending data are contiguous and candidate resources for sending control information corresponding to the contiguous candidate resources for sending data are also contiguous.

Further, the case of contiguous resources mentioned in the embodiments of this disclosure includes one of the following:

resources are contiguous in time domain, for example, the candidate random access resources are time-contiguous MsgA transmission resources;

resource are contiguous in frequency domain, for example, the candidate random access resources are frequency-contiguous MsgA transmission resources; or resources are contiguous in both time domain and frequency domain, for example, the candidate random access resources are transmission resources for MsgA that are contiguous in both time domain and frequency domain.

1. That resources are contiguous in time domain includes: adjacent resources are completely contiguous in time, or a time domain gap between the adjacent resources is less than a first threshold. That adjacent resources are completely contiguous in time means that: a time domain end location of a resource is a time domain start location of a next resource in the adjacent resources, or a time domain end location of a resource is located after a time domain start location of a next resource in the adjacent resources. That a time domain gap between the adjacent resources is less than a first threshold means that: a time gap between a time domain end location of a resource and a time domain start location of a next resource in the adjacent resources is less than the first threshold. The first threshold indicates a relatively small time gap and can be prescribed by a protocol or configured by the network device.

Figure 4:
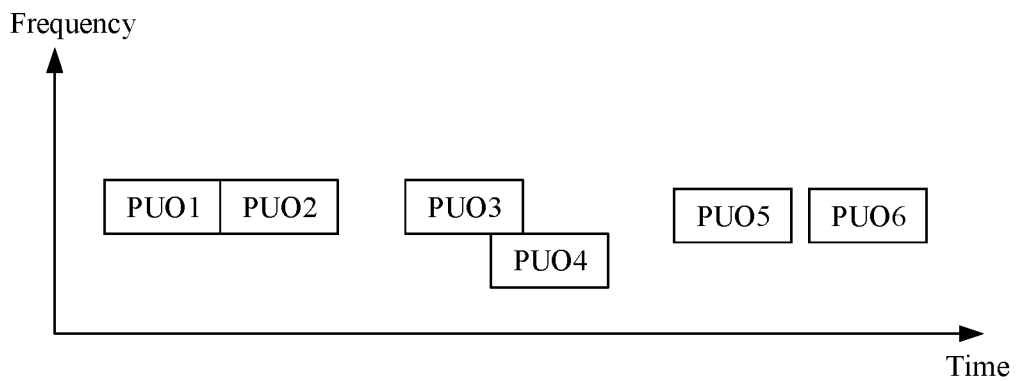
FIG. 4 and FIG. 5 are schematic diagrams of contiguous resource mapping in time domain.

Using the candidate resources for sending data as an example, the candidate resources for sending data include PUSCH occasions (PUO), and the resource allocation information indicates that the candidate random access resources for the random access procedure includes a PUO1, a PUO2, a PUO3, a PUO4, a PUGS, and a PUO6. As shown in FIG. 4, a time domain end location of the PUO1 is a time domain start location of the PUO2, a time domain end location of the PUO3 is located after a time domain start location of the PUO4, and a time gap between a time domain end location of the PUO5 and a time domain start location of the PUO6 is less than the first threshold. At this time, the PUO1 and the PUO2 can be considered as contiguous resources, the PUO3 and the PUO4 can be considered as contiguous resources, and the PUO5 and the PUO6 can be considered as contiguous resources, that is, the three groups of PUOs are each separately contiguous, but these groups of resources together can be considered as noncontiguous. Then, during selection of the target data transmission resource according to the preset selection rule, the terminal selects a group of the latest available PUO1 and PUO2 from the three groups of PUOs, and then randomly selects one of the contiguous PUO1 and PUO2 as the target data transmission resource.

Figure 5:
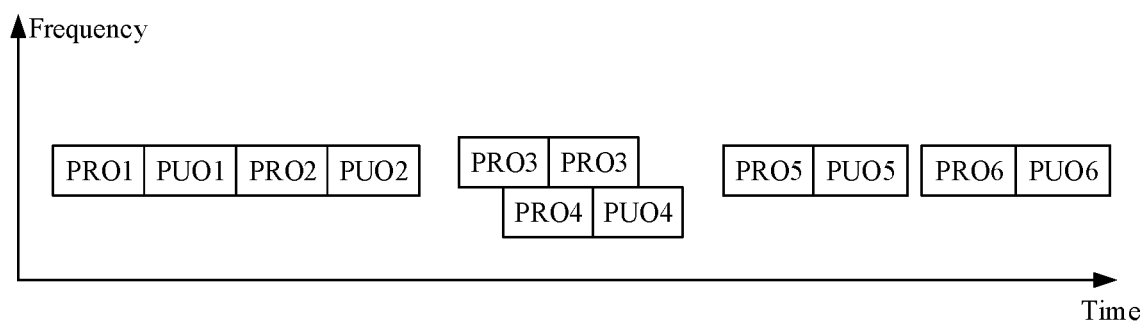

Using the candidate resources for sending data and the candidate resources for sending control information as a whole as an example, the candidate resources for sending data include PUOs, the candidate resources for sending control information include PROs, and the resource allocation information indicates that the candidate random access resources for the random access procedure include: a PUO1, a PUO2, a PUO3, a PUO4, a PUGS, and a PUO6, and a PRO1, a PRO2, a PRO3, a PRO4, a PRO5, and a PRO6 corresponding to the foregoing six PUOs, respectively. As shown in FIG. 5, an overall time domain end location of the PRO1 and the PUO1 is an overall time domain start location of the PRO2 and the PUO2, an overall time domain end location of the PRO3 and the PUO3 is located after an overall time domain start location of the PRO4 and the PUO4, and a time gap between an overall time domain end location of the PRO5 and the PUO5 and an overall time domain start location of the PRO6 and the PUO6 is less than the first threshold. At this time, the three groups of PROs+PUOs can each be considered as separately contiguous, but these groups of PROs+PUOs together can be considered as noncontiguous. Then, during selection of the target data transmission resource according to the preset selection rule, the terminal selects a group of the latest available PRO1+PUO1 and PRO2+PUO2 from the three groups of PROs+PUOs, and then randomly selects one of the contiguous PRO1+PUO1 and PRO2+PUO2 as the target data transmission resource.

It should be noted that, adjacent resources contiguous in time domain can be contiguous or noncontiguous in frequency domain.

2. That resources are contiguous in frequency domain includes: adjacent resources are completely contiguous in frequency, or a frequency domain gap between adjacent resources is less than a second threshold. That adjacent resources are completely contiguous in frequency means that: a frequency domain end location of a resource is a frequency domain start location of a next resource in the adjacent resources, or a frequency domain end location of a resource is located after a frequency domain start location of a next resource in the adjacent resources. That a frequency domain gap between the adjacent resources is less than a second threshold means that: a frequency domain gap between a frequency domain end location of a resource and a frequency domain start location of a next resource in the adjacent resources is less than the second threshold. The second threshold indicates a relatively small frequency domain gap and can be prescribed by a protocol or configured by the network device.

Figure 6:
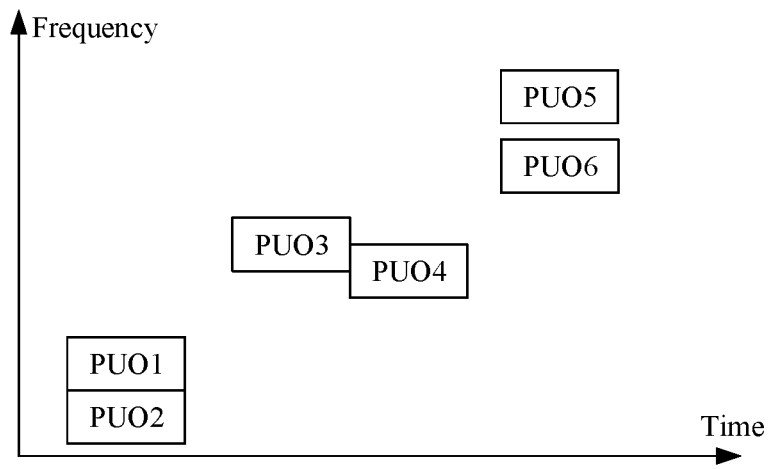
FIG. 6 and FIG. 7 are schematic diagrams of contiguous resource mapping in frequency domain.

Using candidate resources for sending data as an example, the candidate resources for sending data include PUOs, and the resource allocation information indicates that the candidate random access resources for the random access procedure include a PUO1, a PUO2, a PUO3, a PUO4, a PUGS, and a PUO6. As shown in FIG. 6, a frequency domain end location of the PUO1 is a frequency domain start location of the PUO2, a frequency domain end location of the PUO3 is located after a frequency domain start location of the PUO4, and a frequency domain gap between a frequency domain end location of the PUO5 and a frequency domain start location of the PUO6 is less than the second threshold. At this time, the PUO1 and the PUO2 can be considered as contiguous resources, the PUO3 and the PUO4 can be considered as contiguous resources, and the PUO5 and the PUO6 can be considered as contiguous resources, that is, the three groups of PUOs are each separately contiguous, but these groups of resources together can be considered as noncontiguous. Then, during selection of the target data transmission resource according to the preset selection rule, the terminal selects a group of the latest available PUO1 and PUO2 in time domain from the three groups of PUOs, and then randomly selects one of the contiguous PUO1 and PUO2 as the target data transmission resource.

Figure 7:
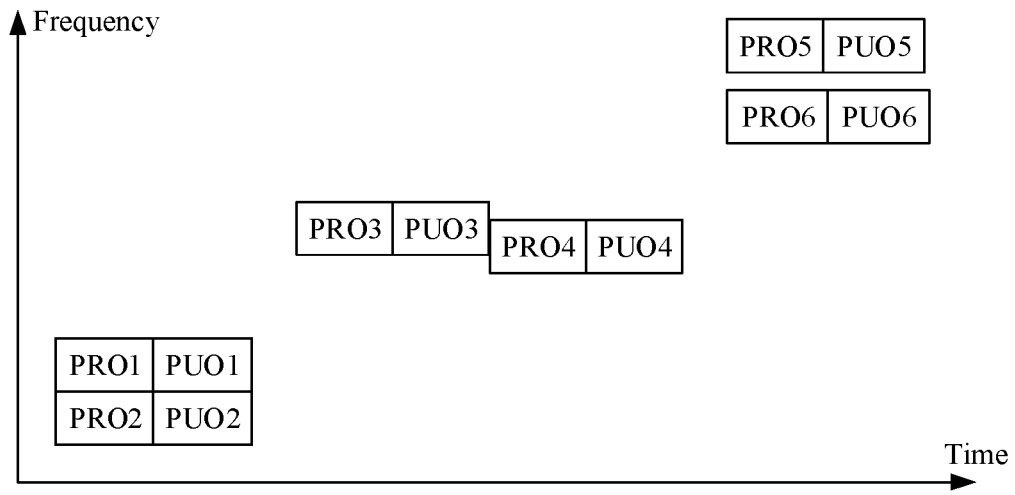

Using the candidate resources for sending data and the candidate resources for sending control information as a whole as an example, the candidate resources for sending data include PUOs, the candidate resources for sending control information include PROs, and the resource allocation information indicates that the candidate random access resources for the random access procedure include: a PUO1, a PUO2, a PUO3, a PUO4, a PUGS, and a PUO6, and a PRO1, a PRO2, a PRO3, a PRO4, a PRO5, and a PRO6 corresponding to the foregoing six PUOs, respectively. As shown in FIG. 7, an overall frequency domain end location of the PRO1 and the PUO1 is an overall frequency domain start location of the PRO2 and the PUO2, an overall frequency domain end location of the PRO3 and the PUO3 is located after an overall frequency domain start location of the PRO4 and the PUO4, and a frequency domain gap between an overall frequency domain end location of the PRO5 and the PUO5 and an overall frequency domain start location of the PRO5 and the PUO6 is less than the second threshold. At this time, the three groups of PROs+PUOs can each be considered as separately contiguous, but these groups of PROs+PUOs together can be considered as noncontiguous. Then, during selection of the target data transmission resource according to the preset selection rule, the terminal selects a group of the latest available PRO1+PUO1 and PRO2+PUO2 in time domain from the three groups of PROs+PUOs, and then randomly selects one of the contiguous PRO1+PUO1 and PRO2+PUO2 as the target data transmission resource.

It should be noted that adjacent resources contiguous in frequency domain can be contiguous or noncontiguous in time domain.

3. That resources are contiguous in both time domain and frequency domain includes: adjacent resources are completely contiguous in time and in frequency, or adjacent resources are completely contiguous in frequency but a time domain gap is less than a third threshold, or adjacent resources are completely contiguous in time but a frequency domain gap is less than a fourth threshold, or a time domain gap between adjacent resources is less than a third threshold and a frequency domain gap is less than a fourth threshold. The third threshold indicates a relatively small time gap, and the fourth threshold indicates a relatively small frequency domain gap, both of which can be prescribed by a protocol or configured by the network device.

Figure 8:
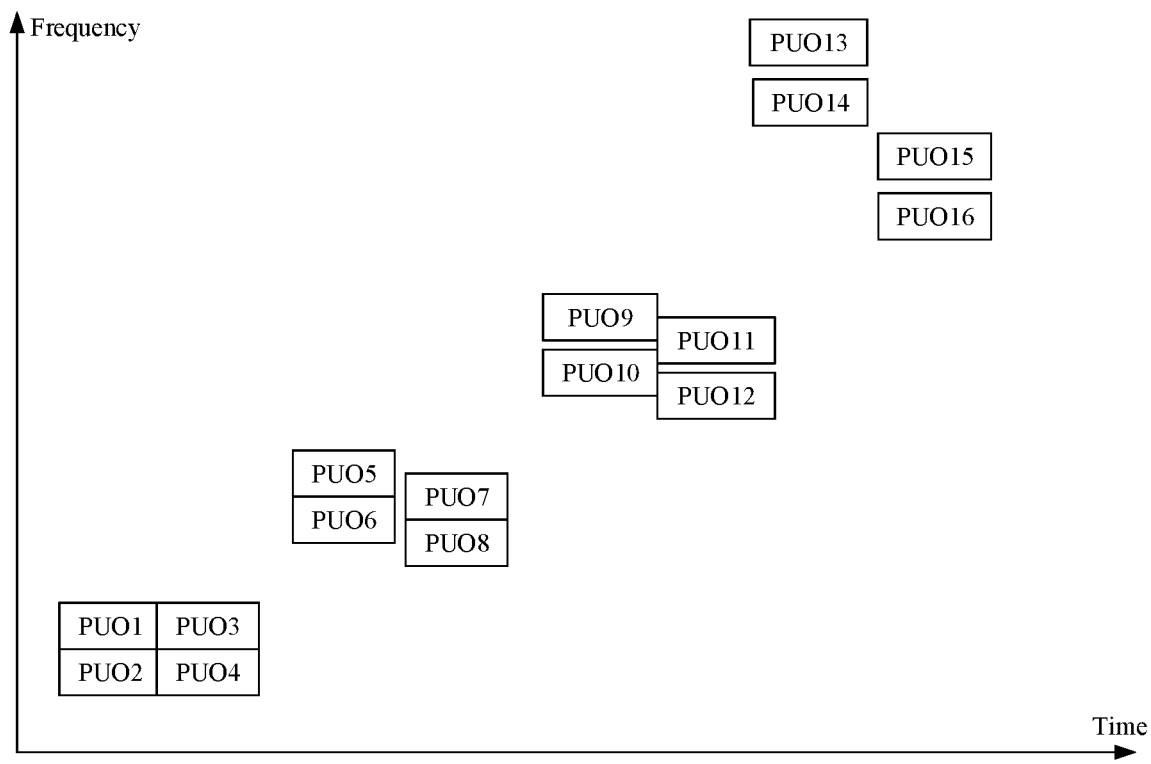
FIG. 8 and FIG. 9 are schematic diagrams of contiguous resource mapping in both time domain and frequency domain.

Using candidate resources for sending data as an example, the candidate resources for sending data include PUOs, and the resource allocation information indicates that the candidate random access resources for the random access procedure includes a PUO1, a PUO2, a PUO3, a PUO4, a PUGS, a PUO6, a PUO7, a PUO8, a PUO9, a PUO10, a PUO11, a PUO12, a PUO13, a PUO14, a PUO15, and a PUO16. As shown in FIG. 8, the PUO1, the PUO2, the PUO3, and the PUO4 are completely contiguous in time-frequency domain, the PUGS, the PUO6, the PUO7, and the PUO8 are completely contiguous in frequency domain and a time domain gap is less than the third threshold, the PUO9, the PUO10, the PUO11, and the PUO12 are completely contiguous in time domain and a frequency domain gap is less than the fourth threshold, and a time domain gap of the PUO13, the PUO14, the PUO15, and the PUO16 is less than the third threshold and a frequency domain gap is less than the fourth threshold. The four groups of PUOs are each separately contiguous, but these groups of resources together can be considered as noncontiguous. Then, during selection of the target data transmission resource according to the preset selection rule, the terminal selects a group of the latest available PUO1, PUO2, PUO3, and PUO4 from the four groups of PUOs, and then randomly selects one of the contiguous PUO1, PUO2, PUO3, and PUO4 as the target data transmission resource.

Figure 9:
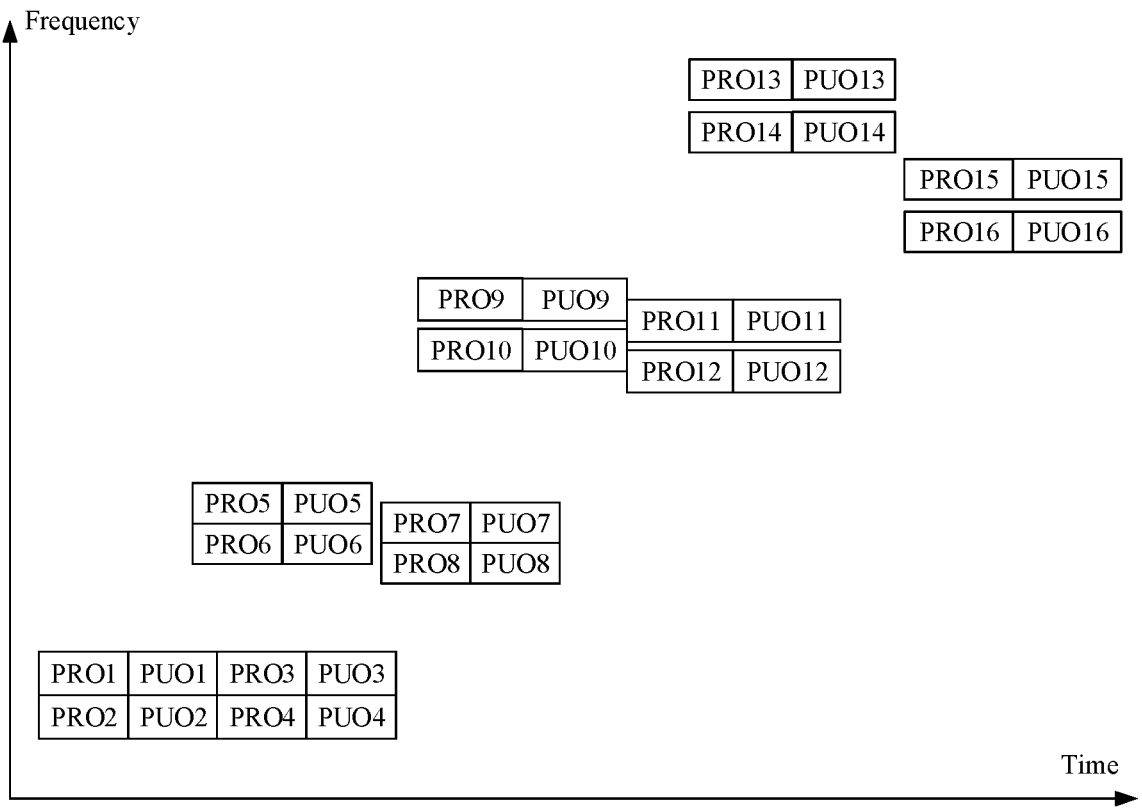

Using the candidate resources for sending data and the candidate resources for sending control information as a whole as an example, the candidate resources for sending data include PUOs, the candidate resources for sending control information include PROs, and the resource allocation information indicates that the candidate random access resources for the random access procedure include: a PUO1, a PUO2, a PUO3, a PUO4, a PUGS, a PUO6, a PUO7, a PUO8, a PUO9, a PUO10, a PUO11, a PUO12, a PUO13, a PUO14, a PUO15, and a PUO16, and a PRO1, a PRO2, a PRO3, a PRO4, a PRO5, a PRO6, a PRO7, a PRO5, a PRO5, a PRO10, a PRO11, a PRO12, a PRO13, a PRO14, a PRO15 and a PRO16 corresponding to the foregoing 16 PUOs, respectively. As shown in FIG. 9, PRO1+PUO1, PRO2+PUO2, PRO3+PUO3, and PRO4+PUO4 are completely contiguous in time-frequency domain, PRO5+PUO5, PRO6+PUO6, PRO7+PUO7, and PRO8+PUO8 are completely contiguous in frequency domain and a time domain gap is less than the third threshold, PRO9+PUO9, PRO10+PUO10, PRO11+PUO11, and PRO12+PUO12 are completely contiguous in time domain and a frequency domain gap is less than the fourth threshold, and a time domain gap of PRO13+PUO13, PRO14+PUO14, PRO15+PUO15, and PRO16+PUO16 is less than the third threshold and a frequency domain gap is less than the fourth threshold. The four groups of PROs+PUOs are each separately contiguous, but these groups of resources together can be considered as noncontiguous. Then, during selection of the target data transmission resource according to the preset selection rule, the terminal selects the latest available group of PRO1+PUO1, PRO2+PUO2, PRO3+PUO3, and PRO4+PUO4 from the four groups of PROs+PUOs, and then randomly selects one of the contiguous PRO1+PUO1, PRO2+PUO2, PRO3+PUO3, and PRO4+PUO4 as the target data transmission resource.

In the random access transmission method of the embodiments of this disclosure, the terminal selects a random access resource based on locations of a plurality of candidate random access resources in a random access procedure, so that the terminal can send a random access message as soon as possible, reducing a random access delay. This can also ensure that all the plurality of candidate random access resources have an opportunity to be selected, thereby improving a random access success rate and resource utilization.

The random access transmission method in different scenarios is described in the foregoing embodiment. An embodiment below further describes a terminal corresponding to the method with reference to an accompanying drawing.

Figure 10:
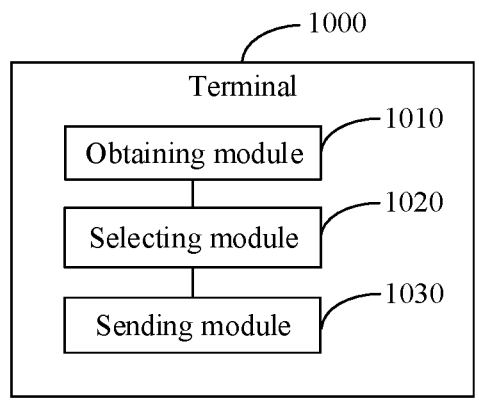
FIG. 10 is a schematic modular structure diagram of a terminal according to an embodiment of this disclosure.

As shown in FIG. 10, the terminal 1000 in this embodiment of this disclosure can implement details of the foregoing method embodiment: obtaining resource allocation information for random access, where the resource allocation information indicates at least two candidate random access resources, and the candidate random access resources include candidate resources for sending data; selecting a target random access resource from the at least two candidate random access resources according to a preset selection rule; and sending a random access request message over the target random access resource, with the same effect achieved. The terminal 1000 specifically includes the following functional modules:

an obtaining module 1010, configured to obtain resource allocation information for random access, where the resource allocation information indicates at least two candidate random access resources, and the candidate random access resources include candidate resources for sending data;

a selecting module 1020, configured to select a target random access resource from the at least two candidate random access resources according to a preset selection rule; and a sending module 1030, configured to send a random access request message over the target random access resource.

The selecting module 1020 includes:

a first selecting submodule, configured to select a target data transmission resource from the candidate resources for sending data in the at least two candidate random access resources according to the preset selection rule; and a first determining submodule, configured to determine the target data transmission resource as the target random access resource.

The candidate random access resources further include: candidate resources for sending control information.

The selecting module 1020 includes:
a second selecting submodule, configured to select a target data transmission resource from the candidate resources for sending data in the at least two candidate random access resources according to the preset selection rule; and
a third selecting submodule, configured to select, according to the preset selection rule, a target control information transmission resource from the candidate resources for sending control information that are corresponding to the target data transmission resource; and
a second determining submodule, configured to determine the target data transmission resource and the target control information transmission resource as the target random access resource.

The selecting module 1020 includes:
a fourth selecting submodule, configured to select a target control information transmission resource from the candidate resources for sending control information in the at least two candidate random access resources according to the preset selection rule;
a fifth selecting submodule, configured to select, according to the preset selection rule, a target data transmission resource from the candidate resources for sending data that are corresponding to the target control information transmission resource; and
a third determining submodule, configured to determine the target control information transmission resource and the target data transmission resource as the target random access resource.

The preset selection rule includes:
in a case of contiguous resources, randomly selecting one of the contiguous resources;
or
in a case of noncontiguous resources, selecting the latest available one of the noncontiguous resources.

The case of contiguous resources includes at least one of the following:
at least two candidate resources for sending data in the candidate random access resources are contiguous;
at least two candidate resources for sending control information in the candidate random access resources are contiguous; or
at least two candidate resources for sending data in the candidate random access resources are contiguous and at least two candidate resources for sending control information in the candidate random access resources are contiguous.

The case of contiguous resources includes one of the following:
resources are contiguous in time domain;
resources are contiguous in frequency domain; and
resources are contiguous in both time domain and frequency domain.

That resources are contiguous in time domain includes: a time domain gap between adjacent resources is less than a first threshold.

That resources are contiguous in frequency domain includes: a frequency domain gap between adjacent resources is less than a second threshold.

That resources are contiguous in both time domain and frequency domain includes: a time domain gap between adjacent resources is less than a third threshold, and a frequency domain gap is less than a fourth threshold.

The resource allocation information includes at least one of the following information:
first resource allocation information of the candidate resources for sending data;
second resource allocation information of the candidate resources for sending control information that are corresponding to the candidate resources for sending data;
first indication information for indicating an association relationship between the candidate resources for sending data and the candidate resources for sending control information;
second indication information for indicating an association relationship between the candidate random access resources and carriers; or
third indication information for indicating an association relationship between the candidate random access resources and signals.

It should be noted that the terminal in this embodiment of this disclosure selects a random access resource based on locations of a plurality of candidate random access resources in a random access procedure, so that the terminal can send a random access message as soon as possible, reducing a random access delay. This can also ensure that the plurality of candidate random access resources have an opportunity to be selected, thereby improving a random access success rate and resource utilization.

It should be noted that, it should be understood that division of the modules of the terminal is merely logical function division. Some or all of the modules may be integrated in a physical entity or may be separated physically in an actual implementation. In addition, the modules may be all implemented in a form of software invoked by a processing component, or may be all implemented in a form of hardware; or some of the modules may be implemented in a form of software invoked by a processing component, and some of the modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

Figure 11:
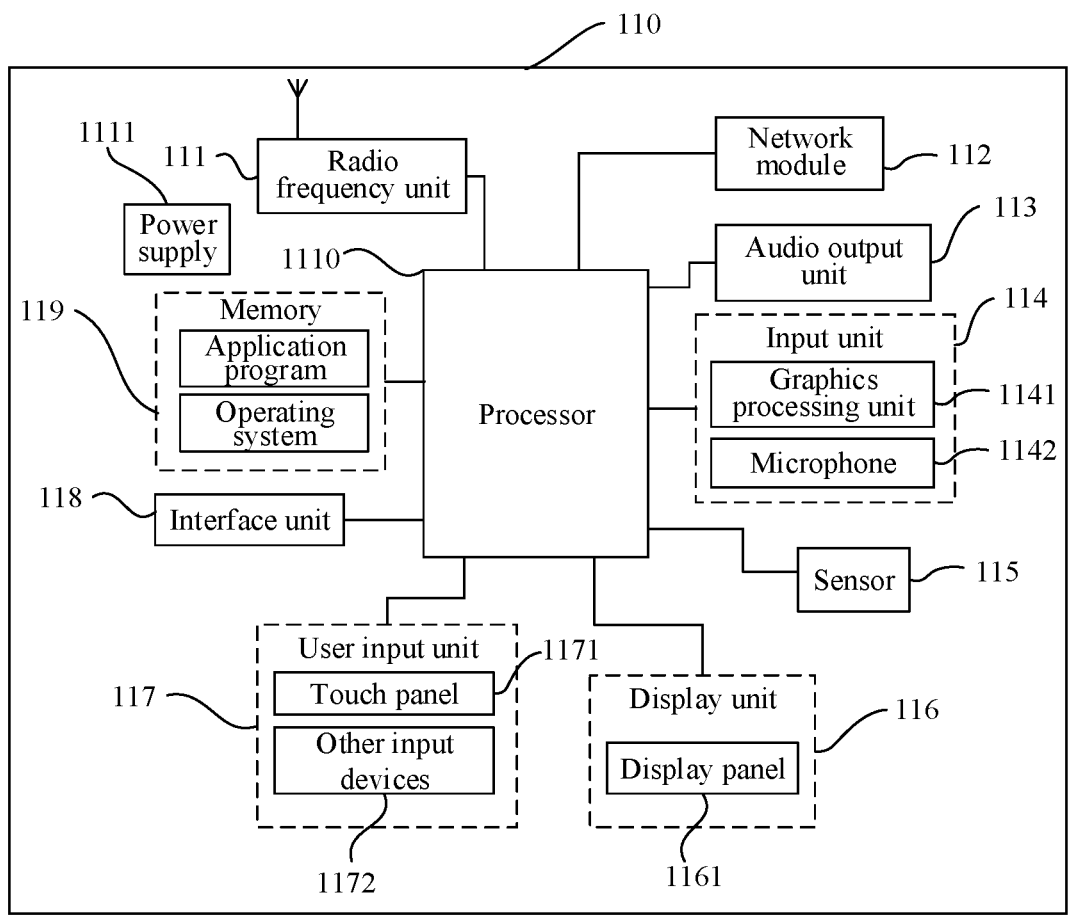
FIG. 11 is a block diagram of a terminal according to an embodiment of this disclosure.

To better achieve the foregoing objective, further, FIG. 11 is a schematic diagram of a hardware structure of a terminal for implementing each embodiment of this disclosure. The terminal 110 includes but is not limited to components such as a radio frequency unit 111, a network module 112, an audio output unit 113, an input unit 114, a sensor 115, a display unit 116, a user input unit 117, an interface unit 118, a memory 119, a processor 1110, and a power supply 1111. Persons skilled in the art may understand that the structure of the terminal shown in FIG. 11 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 111 is configured to obtain resource allocation information for random access, where the resource allocation information indicates at least two candidate random access resources, and the candidate random access resources include candidate resources for sending data.

The processor 1110 is configured to select a target random access resource from at least two candidate random access resources according to a preset selection rule; and control the radio frequency unit 111 to send a random access request message over the target random access resource.

The terminal in this embodiment of this disclosure selects a random access resource based on locations of a plurality of candidate random access resources in a random access procedure, so that the terminal can send a random access message as soon as possible, reducing a random access delay. This can also ensure that the plurality of candidate random access resources have an opportunity to be selected, thereby improving a random access success rate and resource utilization.

It should be understood that, in this embodiment of this disclosure, the radio frequency unit 111 may be configured to transmit or receive a signal in an information transmitting/receiving or call process. Specifically, the radio frequency unit 111 receives downlink data from a base station and transmits the downlink data to the processor 1110 for processing; and transmits uplink data to the base station. Typically, the radio frequency unit 111 includes but is not limited to an antenna, at least one amplifier, a transceiver, a coupler, a low noise amplifier, a duplexer, and the like. In addition, the radio frequency unit 111 may further communicate with a network and another device through a wireless communications system.

The terminal provides wireless broadband internet access for a user by using the network module 112, for example, helps the user transmit and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may further provide audio output (for example, a call signal reception tone or a message reception tone) that is related to a specific function performed by the terminal 110. The audio output unit 113 includes a loudspeaker, a buzzer, a phone receiver, and the like.

The input unit 114 is configured to receive an audio signal or a video signal. The input unit 114 may include a graphics processing unit (GPU) 1141 and a microphone 1142. The graphics processing unit 1141 processes image data of a static picture or a video that is obtained by an image capture apparatus (for example, a camera) in a video capture mode or an image capture mode. A processed image frame may be displayed on the display unit 116. An image frame processed by the graphics processing unit 1141 may be stored in the memory 119 (or another storage medium), or may be sent by the radio frequency unit 111 or the network module 112. The microphone 1142 may receive a sound, and can process the sound into audio data. In a phone call mode, processed audio data may be converted, for output, into a format for transmission by the radio frequency unit 111 to a mobile communications base station.

The terminal 110 further includes at least one sensor 115, for example, an optical sensor, a motion sensor, and another sensor. Specifically, the optical sensor includes an ambient light sensor and a proximity sensor. The ambient light sensor may adjust brightness of a display panel 1161 based on intensity of ambient light. When the terminal 110 moves near an ear, the proximity sensor may disable the display panel 1161 and/or backlight. As a motion sensor, an accelerometer sensor may detect a value of an acceleration in various directions (there are usually three axes), may detect a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 115 may further include a fingerprint sensor, a pressure sensor, an iris sensor, a molecular sensor, a gyroscope, a barometer, a hygrometer, a thermometer, or an infrared sensor. Details are not described herein.

The display unit 116 is configured to display information input by the user or information provided for the user. The display unit 116 may include the display panel 1161. The display panel 1161 may be configured in a form of a liquid crystal display (LCD), an organic light-emitting diode (OLED), or the like.

The user input unit 117 may be configured to receive input digit or character information, and generate a key signal input related to a user setting and function control of the terminal. Specifically, the user input unit 117 includes a touch panel 1171 and other input devices 1172. The touch panel 1171, also referred to as a touchscreen, may capture a touch operation performed by a user on or near the touch panel (for example, an operation performed by the user on the touch panel 1171 or near the touch panel 1171 by using any appropriate object or accessory such as a finger or a stylus). The touch panel 1171 may include two parts: a touch detection apparatus and a touch controller. The touch detection apparatus detects a touch orientation by the user, detects a signal brought by the touch operation, and transmits the signal to the touch controller. The touch controller receives touch information from the touch detection apparatus, converts the touch information into contact coordinates, transmits the contact coordinates to the processor 1110, receives a command transmitted by the processor 1110, and executes the command. In addition, the touch panel 1171 may be implemented in a plurality of forms, for example, a resistive, capacitive, infrared, or surface acoustic wave touch panel. In addition to the touch panel 1171, the user input unit 117 may further include the other input devices 1172. Specifically, the other input devices 1172 may include but are not limited to a physical keyboard, a function key (for example, a volume control key or a power on/off key), a track ball, a mouse, and a joystick. Details are not described herein.

Further, the touch panel 1171 may cover the display panel 1161. After detecting a touch operation on or near the touch panel 1171, the touch panel 1171 transmits the touch operation to the processor 1110 to determine a type of a touch event. Then the processor 1110 provides corresponding visual output on the display panel 1161 based on the type of the touch event. In FIG. 11, the touch panel 1171 and the display panel 1161 serve as two independent components to implement input and output functions of the terminal. However, in some embodiments, the touch panel 1171 and the display panel 1161 may be integrated to implement the input and output functions of the terminal. This is not specifically limited herein.

The interface unit 118 is an interface for connecting an external apparatus to the terminal 110. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 118 may be configured to receive input (for example, data information and electric power) from the external apparatus, and transmit the received input to one or more elements in the terminal 110; or may be configured to transmit data between the terminal 110 and the external apparatus.

The memory 119 may be configured to store software programs and various types of data. The memory 119 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 119 may include a high-speed random access memory, or may include a nonvolatile memory, for example, at least one magnetic disk storage device or a flash memory device, or another volatile solid-state storage device.

The processor 1110 is a control center of the terminal, connects various parts of the entire terminal by using various interfaces and lines, and executes various functions and data processing of the terminal by running or executing a software program and/or a module stored in the memory 119 and invoking data stored in the memory 119, so as to perform overall monitoring on the terminal. The processor 1110 may include one or more processing units. Optionally, the processor 1110 may integrate an application processor and a modem processor. The application processor mainly processes an operating system, a user interface, an application program, and the like. The modem processor mainly processes wireless communication. It may be understood that the modem processor may alternatively not be integrated into the processor 1110.

The terminal 110 may further include the power supply 1111 (for example, a battery) that supplies power to each component. Optionally, the power supply 1111 may be logically connected to the processor 1110 by using a power management system, so as to implement functions such as charging management, discharging management, and power consumption management by using the power management system.

In addition, the terminal 110 includes some functional modules that are not shown. Details are not described herein.

Optionally, an embodiment of this disclosure further provides a terminal, including a processor 1110, a memory 119, and a computer program stored in the memory 119 and capable of running on the processor 1110. When the computer program is executed by the processor 1110, the processes of the foregoing random access transmission method embodiment are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device (User Device or User Equipment). This is not limited herein.

An embodiment of this disclosure further provides a computer readable storage medium, where a computer program is stored in the computer readable storage medium. When the computer program is executed by a processor, the processes of the foregoing random access transmission method embodiment are implemented, and a same technical effect can be achieved. To avoid repetition, details are not described herein again. For example, the computer-readable storage medium is a read-only memory (ROM), a random access memory (RAM), a magnetic disk, or an optical disc.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A random access transmission method, applied to a terminal side and comprising:
   obtaining resource allocation information for random access, wherein the resource allocation information indicates at least two candidate random access resources, and the candidate random access resources comprise candidate resources for sending data and candidate resources for sending control information corresponding to the candidate resources for sending data;
   selecting a target random access resource from the at least two candidate random access resources according to a preset selection rule; and
   sending a random access request message over the target random access resource, wherein the random access request message comprises MsgA (Message A) of a 2-step random access procedure;
   wherein the step of selecting a target random access resource from the at least two candidate random access resources according to a preset selection rule comprises:
   selecting a target control information transmission resource from the candidate resources for sending control information in the at least two candidate random access resources according to the preset selection rule;
   selecting a target data transmission resource from the candidate resources for sending data that are corresponding to the target control information transmission resource; and
   determining the target control information transmission resource and the target data transmission resource as the target random access resource.

2. The random access transmission method according to claim 1, wherein the preset selection rule comprises:
   in a case of contiguous resources, randomly selecting one of the contiguous resources;
   or
   in a case of noncontiguous resources, selecting the latest available one of the noncontiguous resources.

3. The random access transmission method according to claim 2, wherein the case of contiguous resources comprises at least one of the following:
   at least two candidate resources for sending data in the candidate random access resources are contiguous;
   at least two candidate resources for sending control information in the candidate random access resources are contiguous; or
   at least two candidate resources for sending data in the candidate random access resources are contiguous and at least two candidate resources for sending control information in the candidate random access resources are contiguous.

4. The random access transmission method according to claim 2, wherein the case of contiguous resources comprises one of the following:
   resources are contiguous in time domain;
   resources are contiguous in frequency domain; or resources are contiguous in both time domain and frequency domain.

5. The random access transmission method according to claim 4, wherein that resources are contiguous in time domain comprises: a time domain gap between adjacent resources is less than a first threshold.

6. The random access transmission method according to claim 4, wherein that resources are contiguous in frequency domain comprises: a frequency domain gap between adjacent resources is less than a second threshold.

7. The random access transmission method according to claim 4, wherein that resources are contiguous in both time domain and frequency domain comprises: a time domain gap between adjacent resources is less than a third threshold, and a frequency domain gap is less than a fourth threshold.

8. The random access transmission method according to claim 1, wherein the resource allocation information comprises at least one of the following information:
first resource allocation information of the candidate resources for sending data;
second resource allocation information of the candidate resources for sending control information that are corresponding to the candidate resources for sending data;
first indication information for indicating an association relationship between the candidate resources for sending data and the candidate resources for sending control information;
second indication information for indicating an association relationship between the candidate random access resources and carriers; or
third indication information for indicating an association relationship between the candidate random access resources and signals.

9. The random access transmission method according to claim 1, wherein
the candidate resources for sending control information comprises at least one of Physical Random Access Channel (PRACH) preamble or PRACH occasion.

10. A terminal, comprising a processor, a memory, and a computer program stored in the memory and running on the processor, wherein when the computer program is executed by the processor, the steps are implemented:
obtaining resource allocation information for random access, wherein the resource allocation information indicates at least two candidate random access resources, and the candidate random access resources comprise candidate resources for sending data and candidate resources for sending control information corresponding to the candidate resources for sending data;
selecting a target random access resource from the at least two candidate random access resources according to a preset selection rule; and
sending a random access request message over the target random access resource, wherein the random access request message comprises MsgA (Message A) of a 2-step random access procedure;
wherein the step of selecting a target random access resource from the at least two candidate random access resources according to a preset selection rule comprises:
selecting a target control information transmission resource from the candidate resources for sending control information in the at least two candidate random access resources according to the preset selection rule;
selecting a target data transmission resource from the candidate resources for sending data that are corresponding to the target control information transmission resource; and
determining the target control information transmission resource and the target data transmission resource as the target random access resource.

11. The terminal according to claim 10, wherein the preset selection rule comprises:
in a case of contiguous resources, randomly selecting one of the contiguous resources;
or
in a case of noncontiguous resources, selecting the latest available one of the noncontiguous resources.

12. The terminal according to claim 11, wherein the case of contiguous resources comprises at least one of the following:
at least two candidate resources for sending data in the candidate random access resources are contiguous;
at least two candidate resources for sending control information in the candidate random access resources are contiguous; or
at least two candidate resources for sending data in the candidate random access resources are contiguous and at least two candidate resources for sending control information in the candidate random access resources are contiguous;
wherein the case of contiguous resources comprises one of the following:
resources are contiguous in time domain;
resources are contiguous in frequency domain; or
resources are contiguous in both time domain and frequency domain.

13. The terminal according to claim 10, wherein the resource allocation information comprises at least one of the following information:
first resource allocation information of the candidate resources for sending data;
second resource allocation information of the candidate resources for sending control information that are corresponding to the candidate resources for sending data;
first indication information for indicating an association relationship between the candidate resources for sending data and the candidate resources for sending control information;
second indication information for indicating an association relationship between the candidate random access resources and carriers; or
third indication information for indicating an association relationship between the candidate random access resources and signals.

14. The terminal according to claim 10, wherein
the candidate resources for sending control information comprises at least one of Physical Random Access Channel (PRACH) preamble or PRACH occasion.

15. A non-transitory computer-readable storage medium, wherein the non-transitory computer-readable storage medium stores a computer program, and when the computer program is executed by a processor, the steps are implemented:
obtaining resource allocation information for random access, wherein the resource allocation information indicates at least two candidate random access resources, and the candidate random access resources comprise candidate resources for sending data and candidate resources for sending control information corresponding to the candidate resources for sending data;

selecting a target random access resource from the at least two candidate random access resources according to a preset selection rule; and sending a random access request message over the target random access resource, wherein the random access request message comprises MsgA (Message A) of a 2-step random access procedure;

wherein the step of selecting a target random access resource from the at least two candidate random access resources according to a preset selection rule comprises:

selecting a target control information transmission resource from the candidate resources for sending control information in the at least two candidate random access resources according to the preset selection rule;

selecting a target data transmission resource from the candidate resources for sending data that are corresponding to the target control information transmission resource; and determining the target control information transmission resource and the target data transmission resource as the target random access resource.

16. The non-transitory computer-readable storage medium according to claim 15, wherein
the candidate resources for sending control information comprises at least one of Physical Random Access Channel (PRACH) preamble or PRACH occasion.

17. The non-transitory computer-readable storage medium according to claim 15, wherein the preset selection rule comprises:
in a case of contiguous resources, randomly selecting one of the contiguous resources;
or
in a case of noncontiguous resources, selecting the latest available one of the noncontiguous resources.

18. The non-transitory computer-readable storage medium according to claim 17, wherein the case of contiguous resources comprises at least one of the following:

at least two candidate resources for sending data in the candidate random access resources are contiguous;

at least two candidate resources for sending control information in the candidate random access resources are contiguous; or at least two candidate resources for sending data in the candidate random access resources are contiguous and at least two candidate resources for sending control information in the candidate random access resources are contiguous;

wherein the case of contiguous resources comprises one of the following:

resources are contiguous in time domain;

resources are contiguous in frequency domain; or resources are contiguous in both time domain and frequency domain.

19. The non-transitory computer-readable storage medium according to claim 18, wherein that resources are contiguous in time domain comprises: a time domain gap between adjacent resources is less than a first threshold.

20. The non-transitory computer-readable storage medium according to claim 15, wherein the resource allocation information comprises at least one of the following information:

first resource allocation information of the candidate resources for sending data;

second resource allocation information of the candidate resources for sending control information that are corresponding to the candidate resources for sending data;

first indication information for indicating an association relationship between the candidate resources for sending data and the candidate resources for sending control information;

second indication information for indicating an association relationship between the candidate random access resources and carriers; or third indication information for indicating an association relationship between the candidate random access resources and signals.

* * * * *